R. S. KERN.
PISTON.
APPLICATION FILED APR. 5, 1916.
1,218,569.
Patented Mar. 6, 1917.
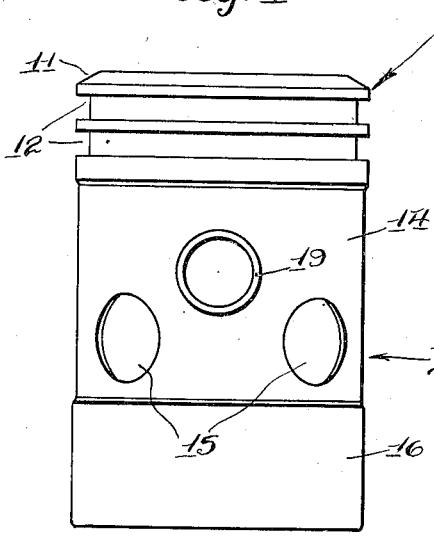
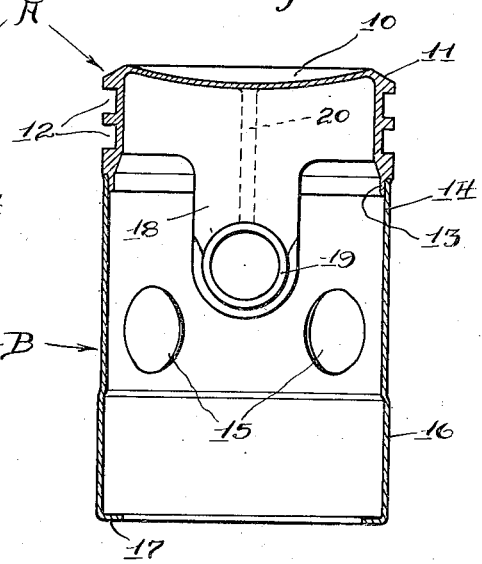
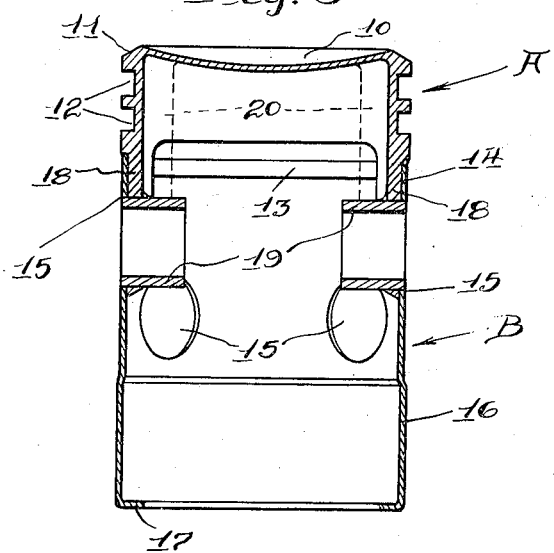
Inventor
Roy S. Kern
by Leslie H. Blacklock Attorney
Witnesses
Alma M. Fritsch
Jesse E. Greenman

UNITED STATES PATENT OFFICE.

ROY S. KERN, OF ST. PAUL, MINNESOTA, ASSIGNOR OF ONE-HALF TO LESLIE H. BLACKLOCK, OF ST. PAUL, MINNESOTA.

PISTON.

1,218,569.  Specification of Letters Patent.  Patented Mar. 6, 1917.

Application filed April 5, 1916. Serial No. 89,079.

*To all whom it may concern:*

Be it known that I, ROY S. KERN, a citizen of the United States, residing at St. Paul, in the county of Ramsey and State of Minnesota, have invented new and useful Improvements in Pistons, of which the following is a specification.

My invention relates to improvements in pistons.

Generally, my object is to provide a light, durable and inexpensive piston particularly though not exclusively adapted for use in high speed internal combustion engines.

My invention also includes various novel features of construction, which are hereinafter particularly described and pointed out in the claims.

In the drawings Figure 1 is a side elevation of my improved piston; Fig. 2 is a central longitudinal sectional view thereof and Fig. 3 is a similar view taken at right angles with respect to said Fig. 2.

My improved piston comprises essentially, an inverted cup shaped head A, preferably a drop forging, and a seamless tubular steel body or skirt B. The top 10 of the head is concave to strengthen the same against the force of explosions above it, and its annular margin 11 is inclined downward to prevent the accumulation of lubricating oil upon said top 10. Annular grooves 12 are formed in said head to receive piston rings and a depending annular flange 13 is formed at the lower edge of the head A. This flange 13 is inserted in the end 14 of the tubular body and is welded thereto. Said end 14 is perforated at 15 to lighten the piston and is smaller in diameter than the circumference of the bearing surface of the head A to form a central annular recess in the piston. The lower end 16 of the body B is enlarged in a die or by a rolling process, the diameter thereof being substantially equal to that of the bearing surface of the head A. Thus it will be seen that the head A provides an annular bearing surface at the upper end of the piston and the end 16 of the body B furnishes an annular bearing surface at lower end of the piston, while the middle portion of said piston is free from contact with the walls of a containing cylinder. The extreme lower end of the body B is turned inward to form a reinforcing flange 17 therefor. I supply the head A with opposed pendent ears 18 perforated at their lower ends. These ears are welded to the inner sides of the body B and alined tubular bushings 19 inserted in the perforations in said ears 18 and passing through registering perforations 15 in the body B are also welded to said ears and body to form a rigid unitary structure. Radial flanges 20 (dotted lines, Figs. 2 and 3) may be formed on the inner periphery of the head A to abut at their lower ends against the bushings 19 and reinforce them, if so desired. In constructing my piston the head A, body B and bushings 19 are preferably welded together in the same operation and the bearing surfaces of the piston and the interior surfaces of the bushings are thereafter machined to proper dimensions. In pistons of small diameter, I omit the pendant ears 18 from the head A and weld the wrist pin bushings 19 at their ends in the body B and in some cases, I employ the radial flanges 20 to reinforce said bushings 19, when said ears are omitted. While I have illustrated and described my preference in welding the ears 18, body B and bushings together it is evident that without departing from the spirit of my invention and to meet certain conditions, the bushings 19 may be omitted and the ears 18 alone employed to form a wrist pin mounting, said ears being welded with the body or spaced apart therefrom, as desired.

My piston is particularly advantageous because of its lightness and resulting adaptability to high speed engines. The drop forged head and rolled steel body provide long wearing non-frictional surfaces. Said piston being formed entirely of steel is less susceptible to expansion and contraction than cast iron or aluminum, ordinarily employed in pistons, and can therefore be machined to fit the cylinder very snugly, thereby eliminating the so called "piston-slap" in engines to which it is applied.

Having described my invention, what I claim as new and desire to protect by Letters Patent is:

1. A piston comprising an inverted cup shaped head with opposed pendent ears thereon perforated at their lower ends, and a tubular metal body telescoped at one end over the lower edge of the head and welded thereto to form a unitary structure, said ears being adapted to form a wrist pin mounting.

2. A piston comprising a head having depending ears thereon, said ears forming a wrist pin mounting and a skirt rigidly and permanently secured on said ears.

3. A piston comprising an inverted cup shaped head with opposed pendent ears thereon perforated at their lower ends, and a tubular metal body secured at one end to the lower edge of the head, said body having an inturned reinforcing flange at its lower end and said ears being adapted to form a wrist pin mounting.

4. A piston comprising a head having integral depending ears thereon said ears being perforated and supplied with wrist pin bushings welded thereto, and a skirt welded on said ears.

5. A piston comprising a cup shaped head with opposed pendent ears thereon perforated at their lower ends, a tubular metal body contracted at one end and telescoped over the open end of said head, bushings in said ears passing through the walls of said body, the overlapping portions of said head, body and bushings being welded together to form a rigid unitary structure.

6. A piston comprising a cup shaped head with opposed pendent ears thereon perforated at their lower ends, a tubular metal body contracted at one end and fitted at said end over the open end of said head, bushings in said ears, the overlapping portions of said head, body and bushings being welded together to form a rigid unitary structure.

7. A piston comprising a cup shaped head with opposed pendent ears thereon perforated at their lower ends, a tubular metal body contracted at one end said contracted end being telescoped over the open end of said head and formed with perforations, two of which register with the perforations in said ears, and bushings in said ears passing through the walls of said body, the overlapping portions of said head, body and bushings being welded together to form a rigid unitary structure.

8. A piston comprising a cup shaped head with opposed pendent ears thereon perforated at their lower ends, a tubular metal body contracted at one end and fitted at said end over the open end of said head, bushings in said ears passing through the walls of said body, and radial reinforcing flanges on the inner periphery of said head abutting against the upper sides of said bushings, the over lapping portions of said head, body and bushings being welded together to form a rigid unitary structure.

9. A piston comprising a head having a pair of opposed integral depending ears thereon each ear being supplied with a wrist pin bushing, and a skirt welded on said ears.

10. A piston comprising a head having depending ears thereon, said ears forming a wrist pin mounting and a skirt rigidly and permanently secured upon said head.

11. A piston comprising a head having depending ears thereon perforated at their lower ends, a tubular metal body welded to said head and formed with perforations which register with the perforations in said ears and bushings in said ears passing through the walls of said body and secured therein.

Whereof, I have hereunto subscribed my name to this specification.

ROY S. KERN.